United States Patent [19]

Brewer et al.

[11] 3,801,377
[45] Apr. 2, 1974

[54] THERMOCOUPLE ASSEMBLY HAVING A FATIGUE RESISTANT LEAD WIRE CONFIGURATION

[76] Inventors: Howell K. Brewer, 1921 N. Longview, Dayton, Ohio 45432; Oral S. McCown, 227 N. Shoffer St., Springfield, Ohio 45504

[22] Filed: Apr. 16, 1973

[21] Appl. No.: 351,669

[52] U.S. Cl.................. 136/233, 136/221, 136/232
[51] Int. Cl............................................. H01v 1/04
[58] Field of Search............ 136/221, 229, 230–234; 73/359

[56] References Cited
UNITED STATES PATENTS

| | | | |
|---|---|---|---|
| 845,413 | 2/1907 | Haagn............................ | 136/233 X |
| 1,876,712 | 9/1932 | Maynard......................... | 136/229 X |
| 3,305,393 | 2/1967 | Breckenridge.................. | 136/225 X |
| 3,637,438 | 1/1972 | Springfield..................... | 136/230 |
| 3,713,899 | 1/1973 | Sebestyen...................... | 136/233 |

FOREIGN PATENTS OR APPLICATIONS

| | | | |
|---|---|---|---|
| 410,572 | 5/1934 | Great Britain.................. | 136/233 |

*Primary Examiner*—Carl D. Quarforth
*Assistant Examiner*—E. A. Miller

[57] ABSTRACT

High fatigue life thermocouples for use in dynamic stress situations are realized by incorporating the thermocouple components into a thin cylindrical rubber housing. The thermocouple sensor junction is embedded in one end of the housing and its lead wires are wound through a helical groove moulded along the housing's peripheral surface. A rubber sheath covers the assembly and restrains the lead wires in place.

1 Claim, 3 Drawing Figures

PATENTED APR 2 1974　　　　　　　　　　　　　　　　3,801,377

THERMOCOUPLE ASSEMBLY HAVING A FATIGUE RESISTANT LEAD WIRE CONFIGURATION

BACKGROUND OF THE INVENTION

This invention relates to temperature measuring devices, and in particular to thermocouples that are suitable for applications in which the thermocouple sensor junction and lead wires are subjected to prolonged periods of dynamic stress.

The testing of deformable elastic materials such as rubber frequently requires temperature measurement under dynamic stress conditions. For example, in the field of tire research and development, it has always been desirable to actually measure and record internal temperature and stress data while the tire is running under load at high speed. However, it is very difficult to measure internal temperature states in deformable materials under dynamic stress because the large deformations cause the thermocouple lead wires to fatigue and break very quickly. Wire made of material that can withstand constant flexing is not suitable for thermocouple use. On the other hand, conventional thermocouple lead wire materials such as iron and constantin have relatively short fatigue life characteristics. There currently exists, therefore, the need for temperature measuring devices that operate reliably over substantially long periods of time in dynamic stress environments. The present invention is directed toward satisfying this need.

SUMMARY OF THE INVENTION

The invention is a thermocouple assembly mounted in a deformable flexile housing and having helically wound lead wires. The housing, fabricated of rubber or like material, is a thin solid rod-like deformable test specimen. The housing is moulded to have a helical groove along its outer surface. The thermocouple sensor junction is embedded in one end of the housing and the lead wires are wound through the helical groove. The housing is covdred by a thin tight fitting sheath of similar material.

It is a principal object of the invention to provide a new and improved thermocouple assembly.

It is another object of the invention to provide a thermocouple assembly that can be used reliably for long periods of time in a dynamic stress situation.

It is another object of the invention to provide a thermocouple asembly having a lead wire configuration that substantially reduces fatigue effects due to dynamic stresses.

These, together with other objects, features and advantages of the invention, will become more readily apparent from the following detailed description taken in conjunction with the illustrated embodiment in the accompanying drawings.

DETAILED DESCRIPTION OF THE PREFERRED EMBODIMENT

Figure 1:
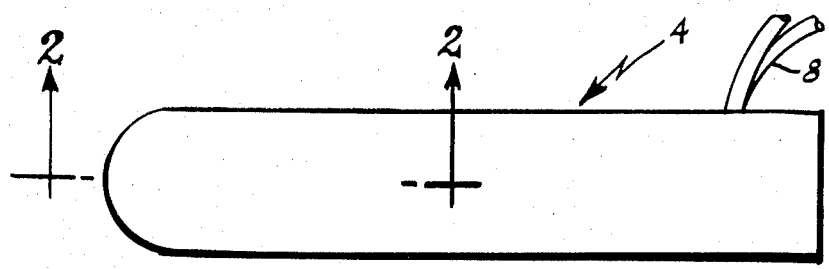
FIG. 1 illustrates one presently preferred embodiment of the invention.
Figure 3:
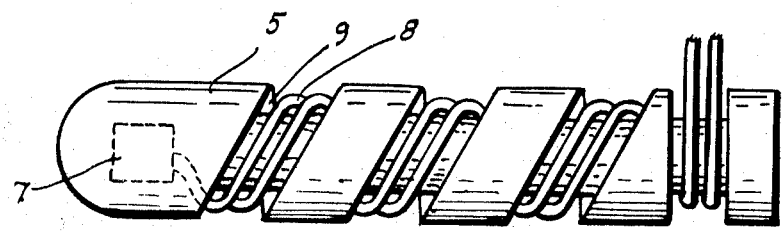
FIG. 3 illustrates the thermocouple assembly of FIG. 1 without its covering sheath.
Figure 2:
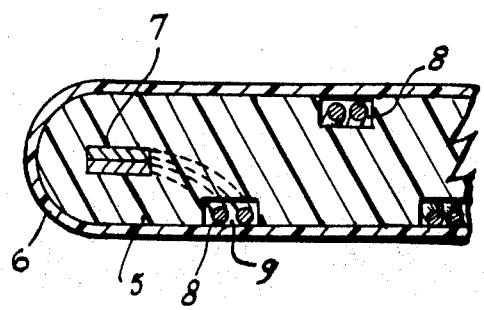
FIG. 2 is a sectional view of FIG. 1 taken at 2-2.

A thermocouple assembly incorporating the principles of the invention is illustrated by FIGS. 1, 2 and 3 of the drawings. Referring thereto, thermocouple 4 comprises housing member 5, sensor junction 7 and lead wires 8. Sheath member 6 covers the assembly and restrains lead wires 8 in place. Housing member 5 is fabricated of flexible deformable material such as rubber and has a helical groove 9 moulded into its peripheral surface to accommodate the thermocouple lead wires. Although only a few helical turns on a short housing member are illustrated, it is intended that the invention include various other appropriate configurations that utilize the lead wire fatigue-alleviating advantage obtained from helically winding and storing the lead wires. In particular, long thin housing members having a large number of helical turns can often be used to advantage.

The thermocouple assembly is constructed by first curing the sensor junction into the tip of the grooved rubber housing member as it is being molded from green uncured rubber. After curing, the lead wires are wound around the housing member in the moulded groove to form a helix. At the end of the housing member opposite the sensor junction the lead wires are tied off so as to temporarily prevent them from unwinding. Finally a thin sheath of uncured rubber is slipped over the housing member and lead wires and is cured into place to form an integral assembly. This thermocouple can now be embedded in any rubber-like material in which internal temperatures are to be measured under cyclic or dynamic loadings. Because of the helical configuration of the lead wires, the large deformations of the rubber specimen are converted into relatively small deformations in the thermocouple wires. This greatly reduces failure of the thermocouple due to fatigue in the lead wires.

While the invention has been described in one presently preferred embodiment, it is understood that the words which have been used are words of description rather than words of limitation and that changes within the purview of the appended claim may be made without departing from the scope and spirit of the invention in its broader aspects.

We claim:

1. A thermocouple assembly comprising a thin cylindrical member of deformable elastic material having a helical groove along its peripheral surface,
   a thermocouple sensor junction embedded in one end of said cylindrical member,
   thermocouple lead wires connected to said sensor junction and wound through said helical groove, and
   a sheath member of deformable elastic material covering said cylindrical member.

* * * * *